Dec. 26, 1961     R. L. CARLSTEDT     3,014,384
APPARATUS FOR PREVENTING VIBRATION OF BORING BAR
Original Filed Feb. 27, 1957
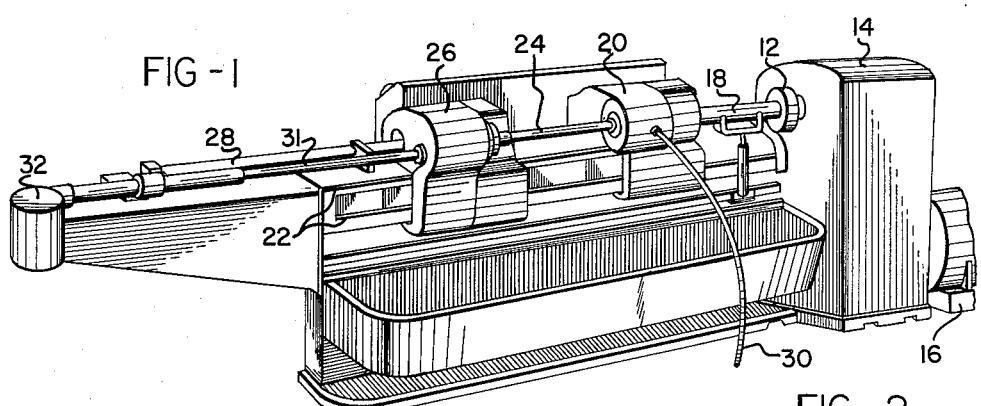
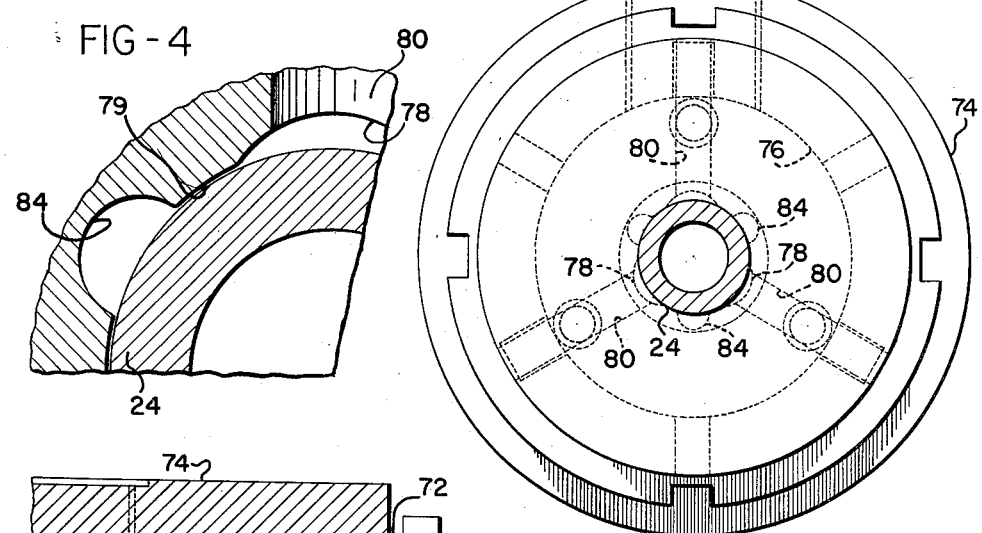
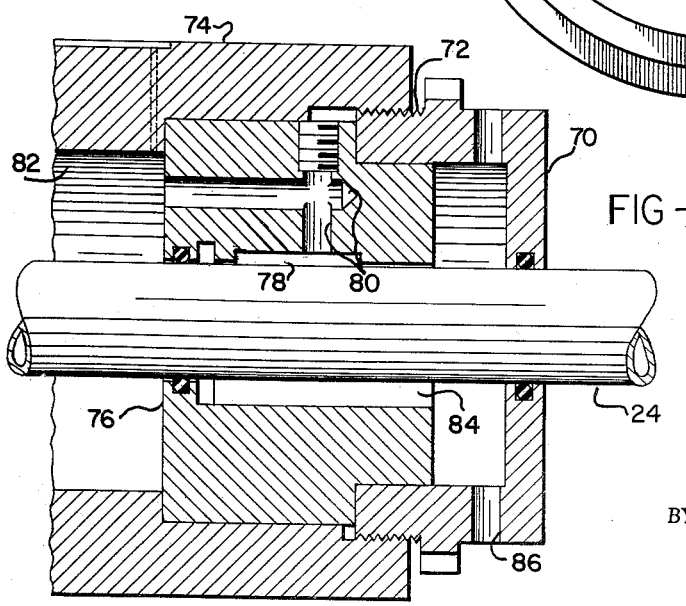
INVENTOR.
RAGNAR L. CARLSTEDT
BY
ATTORNEYS

United States Patent Office 3,014,384
Patented Dec. 26, 1961

3,014,384
APPARATUS FOR PREVENTING VIBRATION
OF BORING BAR
Ragnar Leonard Carlstedt, Glenside, Pa., assignor to The
R. K. LeBlond Machine Tool Company, Cincinnati,
Ohio, a corporation of Ohio
Original application Feb. 27, 1957, Ser. No. 642,826, now
Patent No. 2,903,916, dated Sept. 15, 1959. Divided
and this application June 2, 1959, Ser. No. 817,515
4 Claims. (Cl. 77—3)

This invention relates to boring machines and in particular to boring machines adapted for boring deep holes at a rapid rate in workpieces. More particularly still, this invention is concerned with a boring machine in which the workpiece rotates and the boring bar is held against rotation while the boring bar and workpiece are moved axially relative to each other to force the cutting tool portion of the boring bar into the work.

Due to the fact that boring machines of the nature referred to above are sometimes required to bore holes of especially great length, it follows that the boring bars will sometimes be of considerable length. Such bores are not always of large diameter, and the boring bars are thus quite often relatively slender. Such boring bars have a tendency to deflect and vibrate, and this, of course, detracts from the quality of the hole being bored. It is customary to employ guide bushings and the like for guiding the boring bars, but heretofore such guide bushings have been of a type that provided for support of the boring bar by maintaining an extremely small clearance thereabout. Such a guide bushing is not always satisfactory for maintaining the boring bar stabilized and free of vibration due to irregularities in the size of the boring bar or due to surface defects thereon, particularly when the boring bar is quite slender.

Having the foregoing in mind, it is a primary object of the present invention to provide an improved supporting and guiding arrangement for the boring bar of a boring machine of the nature referred to.

A still further object of the present invention is the provision of a support and guide arrangement and a method of guiding a boring bar for a deep hole boring machine in which small irregularities in the surface of the boring bar will not effect scoring of the bushing or detracting from the guiding efficiency thereof.

A still further object of the present invention is the provision of a support and guide arrangement for the boring bars of deep hole boring machines of the nature referred to in which the support and guide is effective for supporting the boring bar directing working operation thereof only while permitting free movement of the boring bar within predetermined limits when the boring bar is being retracted.

It is also an object of this invention to utilize the pressure of the cooling fluid being supplied to the boring bar for assisting in the guiding of the boring bar.

A particular object of the present invention is the provision of an arrangement for supporting and guiding and preventing vibration of an elongated relatively slender boring bar in a deep hole boring machine in which mechanical engagement of the boring bar by the stabilizing means therefor is eliminated.

These and other objects and advantages of this invention will become more apparent upon reference to the following specification taken in connection with the accompanying drawings, wherein:

FIGURE 1 is a perspective view of a boring machine according to the present invention;

FIGURE 2 is a view looking in from the rear end of the clamp of the boring machine;

FIGURE 3 is a vertical sectional view indicated by line 3—3 on FIGURE 2 showing the fluid passages within the member in the clamp that forms the guide bushing for the boring bar; and FIGURE 4 is a view drawn at enlarged scale showing the fluid passage around the boring bar for the stabilizing fluid.

Referring to the drawings somewhat more in detail, FIGURE 1 is a perspective view and shows in general a boring machine according to the present invention, and which machine comprises a frame which has at one end a spindle 12 driven by a drive mechanism such as V-belts located within end casting 14 and receiving power from an electric motor 16.

Spindle 12 is adapted for drivingly engaging one end of a workpiece 18, the other end of which is engaged by a clamp 20 slidably supported on frame 10 as upon the ways 22. A hydraulic motor may be employed for urging clamp 20 rightwardly into engagement with the left end of workpiece 18 whereby the workpiece is supported within the machine. The portion of clamp 20 that engages workpiece 18 is rotatable so that driving of spindle 12 will cause rotation of workpiece 18.

The machine comprises a tubular boring bar 24 which extends sealingly into the left end of clamp 20 and engages work member 18. The left end of boring bar 24 is fixed to a boring slide 26 slidable along ways 22 and adapted for being driven therealong by a hydraulic motor 28.

The clamp 20 is adapted for receiving a supply of cooling liquid such as cutting oil under high pressure up to, say 600 to 800 pounds per square inch, via a conduit 30; and, this cooling fluid passes through the clamp and along the bore formed by the boring bar, and thence into the open right end of the boring bar and then leftwardly through the hollow boring bar carrying with it the chips cut from the workpiece.

This mixture of cooling fluid and chips passes through boring head 26 and into the telescopic discharge pipe 31, the left end of which is connected into cyclone 32, wherein the velocity of the fluid is reduced, and it is then passed into a filter or settling tank so that substantially clean fluid can be returned to the pressure side of the cooling fluid system.

In the arrangement described in my copending application Serial No. 642,826, filed February 27, 1957, which issued as Patent No. 2,903,916 on September 15, 1959 and entitled "Apparatus for Preventing Vibration of Boring Bars." the boring bar is directly engaged by metallic shoes, preferably of a relatively soft bearing material. These shoes, according to the invention of the said copending application, are thrust inwardly against the boring bar by the fluid pressure of the coolant fluid being supplied to the boring bar. The present invention also contemplates utilizing the coolant fluid directly for holding the boring bar steady against vibrating influences; and the manner in which this is accomplished is illustrated in FIGURES 2 and 3.

FIGURE 2 is a view looking in from the rear end of the clamp of the boring machine, and FIGURE 3 is a vertical section taken therethrough. In these figures, it will be observed that the boring bar 24 passes sealingly through an end cap 70 threaded as at 72 into the end of the casing 74 of the clamp. Cap 70 clamps a block 76 in housing 74, and which block is provided with spaced chambers 78 about the central bore thereof that communicate via drill passages 80 with the chamber 82 to which the coolant fluid is supplied to the clamp.

Also spaced about the central bore of block 76 and located intermediate the chambers 78 are other chambers 84 which open into the interior of cap 70. Cap 70 is continuously drained through drain ports 86, and it will be evident that passages or chambers 84 are thus always under exhaust.

It will be evident that with a supply of fluid under high pressure to the chambers 78 and with the chambers 84 being exhausted, there will be a flow of fluid through the small clearance 79 (see FIGURE 4) about the boring bar within the block 76 that will hold the boring bar in the center of the central bore of the block, and likewise support it against deflecting movements and damp out any vibratory movement therefrom. It will also be evident that the arrangement is substantially friction free, and that slight irregularities in the surface of the boring bar will not effect the efficiency of the supporting and guiding arrangement.

The supporting and guiding of the boring bar takes place only during its working movement when there is a supply of pressure fluid to the boring bar and the work while during retracting movement of the boring bar the supply of coolant under high pressure is interrupted and pressure is thus absent from the guide bushing and the boring bar is free to move therethrough in being withdrawn from the work.

This application is a division of my application Serial No. 642,826, filed February 27, 1957, now Patent No. 2,903,916 and entitled "Apparatus for Preventing Vibration of Boring Bars."

It will be understood that this invention is susceptible to modification in order to adapt it to different usages and conditions; and, accordingly, it is desired to comprehend such modifications within this invention as may fall within the scope of the appended claims.

I claim:

1. In a boring machine of the nature described; a hollow clamp, a block in the clamp having a bore for reciprocably receiving a non-rotatable boring bar with, slight clearance, said bore having a plurality of recesses formed therein in uniformly spaced relation about the bar closed at their opposite ends, passage means in the block for supplying hydraulic fluid under pressure from inside said clamp through said block to said recesses, said block also comprising a plurality of grooves extending along said bore intermediate said recesses and connected with exhaust whereby the pressure fluid supplied to said recesses flows circumferentially about the surface of the boring bar to the grooves thereby cushioning the boring bar in the bore and holding it therein against vibration, and means for supplying a coolant fluid under high pressure to the inside of said clamp.

2. In a boring machine of the nature described; a hollow workpiece clamp adapted for clamping a workpiece against a spindle to be driven in rotation thereby, a non-rotatable boring bar extending axially through the clamp so as to engage the end of the workpiece, a block in the end of the clamp opposite the workpiece having a bore through which the boring bar reciprocably passes with slight clearance, a high pressure coolant connection to the interior of the clamp external of the boring bar between the block and the workpiece end of the clamp, seal means between the said connection and the bore through the block, and means located in said block hydraulically connected with said coolant connection operable in response to pressure supplied to said connection for supporting said bore bar against vibration and deflection as it advances through said clamp during a boring operation, said means comprising a plurality of first hydraulic chamber means formed in the periphery of said bore and spaced circumferentially about the bore in said block, said first chambers being closed at their opposite ends and communicating with the inside of the clamp so as to receive pressure from the interior of said clamp when pressure is supplied thereto via said coolant connection, and a plurality of other chamber means formed in the periphery of the bore and interposed between the first mentioned chamber means and connected with exhaust whereby a continuous circumferential flow of pressure fluid about the bar is had thereby supporting the said boring bar.

3. In a boring machine; a hollow workpiece clamp having means at one end to engage a workpiece to be bored, a non-rotatable boring bar extending through said clamp from the other end so as to engage the end of the workpiece to be bored, a block in the said other end of the clamp having a bore through which the boring bar reciprocably passes with slight clearance, a conduit connected to the clamp between the said block and the workpiece end thereof operable to supply coolant under high pressure to the outside of the boring bar and therealong to the bore in the workpiece, said block being sealed about the boring bar at the inner end of the block, passage means in the block for conveying pressure fluid from said conduit through said block to a plurality of points intermediate the ends of the block and uniformly spaced about the periphery of the bar, and other passage means in the block connecting other points about the bar intermediate the first mentioned points within the block with exhaust whereby a continuous circumferential flow of fluid is had about the bar from said first mentioned points to said other points during the period that pressure is supplied to said clamp via said conduit.

4. In a boring machine of the nature described; a hollow workpiece clamp adapted for clamping a workpiece against a spindle to be driven in rotation thereby, a non-rotatable boring bar extending axially through the clamp so as to engage the end of the workpiece, a block in the end of the clamp opposite the workpiece having a bore through which the boring bar reciprocably passes with slight clearance, a high pressure coolant connection to the interior of the boring bar between the block and the workpiece end of the clamp, seal means between the said connection and the bore through the block and means located in said block hydraulically connected with said coolant connection operable in response to pressure supplied to said connection for supporting said bore bar against vibration and deflection as it advances through said clamp during a boring operation, said means comprising a plurality of first hydraulic chamber means formed in the periphery of said bore and spaced circumferentially about the bore in said block, said first chambers being closed at their opposite ends and communicating with the inside of the clamp so as to receive pressure from the interior of said clamp when pressure is supplied thereto via said coolant connection and a plurality of other chamber means formed in the periphery of the bore and interposed between the first mentioned chamber means and connected with exhaust whereby a continuous circumferential flow of pressure fluid about the bar is had thereby supporting the said boring bar, said first mentioned chamber means being of greater circumferential extent than said other chamber means and also of greater circumferential extent than the land area between adjacent ones of said chamber means.

References Cited in the file of this patent

UNITED STATES PATENTS

| 1,236,511 | Waring | Aug. 14, 1917 |
| 1,254,909 | Howe | Jan. 29, 1918 |
| 2,422,741 | Morley | June 24, 1947 |

FOREIGN PATENTS

| 1,096,352 | France | Jan. 26, 1955 |